United States Patent Office 3,511,806
Patented May 12, 1970

---

3,511,806
ALPHA-OLEFIN POLYMERS HAVING IMPROVED ULTRAVIOLET STABILITY
Jackson S. Boyer, Claymont, Del., and Richard D. Cassar, West Chester, Pa., assignors to Sun Oil Company, Philadelphia, Pa., a corporation of New Jersey
No Drawing. Filed Dec. 18, 1967, Ser. No. 691,129
Int. Cl. C08f 45/58
U.S. Cl. 260—45.85       22 Claims

ABSTRACT OF THE DISCLOSURE

A solid substantially crystalline alpha-monoolefin polymer composition having improved resistance to ultraviolet degradation comprising a solid crystalline alpha-monoolefin polymer containing 0.05–10.0 weight percent of certain polymethylated muconic acids and/or their hydrocarbyl monoesters or diesters, said acids being selected from the group consisting of $\alpha,\alpha'$-dimethylmuconic acid, $\alpha,\beta'$-dimethylmuconic acid, $\alpha,\alpha'$-$\beta$-trimethylmuconic acid, $\alpha,\beta,\beta'$-trimethylmuconic acid, and $\alpha,\alpha',\beta,\beta'$-tetramethylmuconic acid, and to methods of preparing said compositions.

CROSS REFERENCE TO RELATED APPLICATIONS

The present application is related to our copending U.S. patent application Ser. No. 691,199 which relates to elastomeric compositions containing polymethylated muconic acids and their esters and is also related to our copending U.S. patent application Ser. No. 691,153 which relates to petroleum hydrocarbon fractions containing polymethylated muconic acids and their esters, both applications being filed of even date herewith.

BACKGROUND OF THE INVENTION

The present invention relates to the improvement of ultraviolet stability of solid substantially crystalline alpha-monoolefin polymers. More particularly, this invention relates to novel crystalline alpha-olefin polymer compositions having improved ultraviolet stability, and to the method of preparing those compositions.

Recent developments in the science of alpha-monoolefin polymerization has provided a variety of new crystalline thermoplastic polymeric materials. These polymers generally have physical characteristics which render them most useful for many applicaations and thus commercially very attractive. These polymers can be molded or otherwise fabricated to form many useful articles. Unfortunately, alpha-monoolefin polymers are susceptible to degradation resulting from oxidation generally initiated by heat, mechanical working, and particularly by ultraviolet light. This degradation apparently can be caused by free radical formation in the polymer composition initiated by ultraviolet light and promoted by oxygen and impurities in the polymer such as metals and metallic salts. The free radicals which are formed apparently undergo chemical reaction with the polymer itself resulting in undesirable chemical and physical transformation. This transformation is normally first recognized in the form of discoloration such as yellowing of the polymer. More extreme degradation results in premature deterioration of the polymer in the form of loss of tensile strength, pliability, impact strength, and in some cases, loss of surface gloss.

One effective method of reducing ultraviolet initiated degradation of solid crystalline alpha-monoolefin polymers consists of adding an ultraviolet stabilizing compound to the polymer composition.

DESCRIPTION OF THE INVENTION

We have now discovered that certain polymethylated muconic acids and their esters are effective in improving the resistance of solid crystalline alpha-olefin polymers to ultraviolet initiated discoloration and degradation.

It has now been discovered that alpha-monoolefin polymers containing 0.05–10.0 weight percent, based on the weight of the polymer of certain di-, tri-, and tetramethylmuconic acids and their hydrocarbyl esters, have improved resistance to ultraviolet initiated degradation.

It has been discovered that the cis-cis, cis-trans, or trans-trans isomers of $\alpha,\alpha'$-dimethylmuconic acid, $\alpha,\beta'$-dimethylmuconic acid, $\alpha,\alpha',\beta$-trimethylmuconic acid, $\alpha,\beta,\beta'$-trimethylmuconic acid, $\alpha,\alpha',\beta,\beta'$-tetramethylmuconic acid or their monoesters wherein one carboxyl group is attached to a $C_1$–$C_{20}$ hydrocarbyl radical, or their diesters wherein each carboxyl group is attached to a $C_1$–$C_{20}$ hydrocarbyl radical, and mixtures thereof when added to solid substantially crystalline alpha-olefin polymers in the quantity of 0.5–10.0 weight percent based on the weight of the whole composition provides a polymer composition having improved resistance to ultraviolet degradation. The preferred concentration of polymethylated muconic acid or its esters in the alpha-olefin polymer composition is generally in the range of 1.0–3.0 weight percent.

Each of the above-disclosed polymethylated muconic acids in the cis-cis, cis-trans, or trans-trans isomeric form or mixtures thereof is effective for use in the compositions of the present invention. Also, the $C_1$–$C_{20}$ hydrocarbyl monoesters or diesters of these acids or mixtures thereof are effective for use in the compositions of the present invention.

The $C_1$–$C_{20}$ hydrocarbyl esters included in the present invention are selected from the hydrocarbyl radicals of $C_1$–$C_{20}$ hydrocarbons having acyclic, cyclic, and aromatic structures such as those disclosed in the text "Handbook of Hydrocarbons," S. W. Ferris, Academic Press Inc., New York, N.Y. (1955), pages 145–249, all of which are incorporated herein by reference. The preferred esters of the present invention are the $C_1$–$C_{10}$ hydrocarbyl mono- and diesters of of the polymethylated muconic acids disclosed above. Examples of the $C_1$–$C_{10}$ hydrocarbyl groups include methyl, ethyl, propyl, butyl, pentyl, hexyl, heptyl, octyl, nonyl, decyl cyclopentyl, methyl cyclopentyl, dicyclopentyl, cyclohexyl, phenyl, tolyl, xylyl, naphthyl, tetrahydronaphthyl, decahydronaphthyl, as well as the various isomers of each.

The diester of the muconic acid can be a mixed ester. An illustrative example is the cis-cis isomer of $\alpha,\alpha'$-dimethylmuconic acid which can be illustrated by the following structural formula:

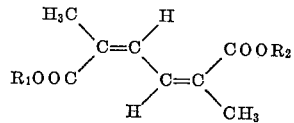

wherein $R_1$ is different from $R_2$. That is to say, $R_1$ can be a hydrocarbyl group of $C_1$–$C_{20}$ and $R_2$ can be a different hydrocarbyl group of $C_1$–$C_{20}$, e.g., $R_1$ equals cyclohexyl ($C_6$) and $R_2$ equals eicosyl ($C_{20}$).

Examples of some of the esters of the polymethylated muconic acids suitable for use in the compositions of the present invention include the cis-cis, cis-trans, and trans-trans isomers of the mono- and di-methyl esters of $\alpha,\beta'$-dimethylmuconic acid; the mono- and di-phenyl esters of $\alpha,\alpha',\beta,\beta'$-tetramethylmuconic acid; the mono- and di-naphthyl esters of $\alpha,\beta,\beta'$-trimethylmuconic acid; the mono- and di-5,6-diethylacenaphthyl esters of $\alpha,\alpha'$-dimethylmuconic acid; the mono- and di-cyclohexyl ester of $\alpha,\alpha'$-dimethylmuconic acid; the mono- and di-1,2-dimethylcycloheptyl esters of α,β'-dimethylmuconic acid; the mono- and di-decahydronaphthyl esters of α,α',β,β'-tetramethylmuconic acid; the mono- and di-1,3-dipropylbenzyl esters of α,α'-dimethylmuconic acid; the mono- and di-2,9-dimethyl-4,7-diisobutyldecyl esters of α,α',β-trimethylmuconic acid; and the mono- and di-anthracyl esters of α,β'-dimethylmuconic acid; the mono- and di-2,6,10-trimethyl dodecyl esters of α,α',β,β'-tetramethylmuconic acid; and the nonyl ethyl esters of α,α',β-trimethylmuconic acid.

Specifically it has been discovered that the cis-cis, cis-trans, or trans-trans isomers of the following compounds are effective ultraviolet stability improvement additives when incorporated in alpha-monoolefin polymer compositions. These additive compounds are selected from (a) Polymethylated muconic acids selected from the group consisting of α,α'-dimethylmuconic acid, α,β'-dimethylmuconic acid, α,α',β-trimethylmuconic acid, α,β,β'-trimethylmuconic acid, and α,α',β,β'-tetramethylmuconic acid, (b) The hydrocarbyl monoesters of said diacids wherein the hydrocarbyl group contains 1–20 carbon atoms, (c) Hydrocarbyl diesters of said diacids wherein each hydrocarbyl contains 1–20 carbon atoms, and (d) Mixtures of any of the above.

As noted above, polymethylated muconic acids can exist in three isomeric forms, viz. cis-cis, trans-trans, and cis-trans. As an example, the unsaturated diacid, α,α'-dimethylmuconic acid, can be depicted by the following structural formulas:

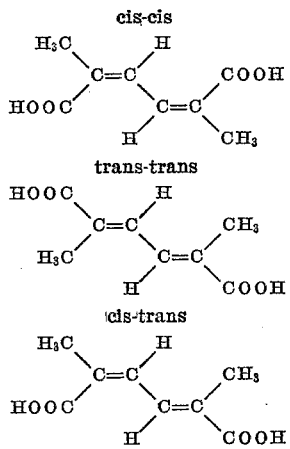

The preparation of each of these isomeric forms of the α,α'-dimethylmuconic acid has been described in the prior art by Elvidge et al., J. Chem. Soc., pages 1026–1033 (1952). These authors show that oxidation of p-xylenol by means of peracetic acid gave the cis-cis form of the acid. The other isomeric forms were obtained indirectly by conversion of the cis-cis form. Also dimethyl esters of each of the three isomeric forms were prepared by shaking the respective DMMA with ethereal diazomethane.

The cis-cis form of polymethylated muconic acids can also be obtained by biological oxidation of p-xylene utilizing special strains of microorganisms as disclosed in U.S. application Ser. No. 509,621, filed Nov. 24, 1965 and now U.S. Pat. No. 3,383,289 issued May 14, 1968.

The solid crystalline alpha-monoolefin polymers of the compositions of the present invention are those polymers recovered from the stereospecific polymerization of alpha-monoolefins such as $C_2$–$C_8$ olefins, including ethylene, propylene, butene-1, pentene-1, hexene-1, 4-methylpentene-1, and mixtures thereof. These monomers can be polymerized to high molecular weight polymers by the procedure and catalysts disclosed in U.S. Pat. Nos. 2,827,446; 2,996,491; 2,996,493; 3,055,878; 3,061,601; and 3,099,647; and Belgian Pat. Nos. 533,362; 534,792; and 534,888; and others. In the polymerization process the insoluble polymer precipitates from liquid components of the reaction medium in the form of finely divided particles. Also, a small amount of the polymer product, which is substantially amorphous and soluble in the inert polymerization solvent, is produced. In the process of separating the insoluble polymer powder from the polymerization liquid, e.g., by centrifuging, most of the soluble polymer is separated from the insoluble powder and is carried off with the polymerization liquid.

The insoluble powder is then recovered in the form of a white finely divided powder which can be molded into solid articles. It is this solid crystalline alpha-monoolefin polymer to which the ultraviolet stabilizer can be added to provide a polymer having improved ultraviolet stability.

The polymethylated muconic acids and muconates of the compositions of the present invention can be incorporated into the polymer by simply adding the desired amount of the additive to the polymer in a finely divided form and agitating the blend until a fairly homogeneous mixture is obtained. The blend is thereafter melted and extruded to provide the finished composition. Any of the many other procedures of incorporating additives into crystalline polymer powder well known to those skilled in the art can also be utilized in the practice of the methods and compositions of the present invention.

After the polymer is stabilized in accordance with the present invention, it is thereafter normally melted and extruded into the desired form. Generally usable forms include pellets, fibers, films, and solid injection molded or blow molded articles.

As one means of illustrating the present invention, the following examples are presented:

EXAMPLE I

Propylene monomer was polymerized in a glass-lined autoclave at a temperature of about 70° C. at 60 p.s.i.g. pressure. The polymerization was effected by dissolving the propylene in hexane in the presence of a catalyst complex consisting of titanium trichloride and diethylaluminum chloride.

A hexane insoluble white finely divided solid crystalline polypropylene powder having a melting point of about 165° C. was recovered as a product of the polymerization. A sample of this polymer was compression molded at a pressure of 4000 p.s.i. at a temperature of 450° F. into a plaque measuring 4″ x 4″ x ⅛″.

EXAMPLE II

A sample of the dimethyl ester of trans-trans α,α'-dimethylmuconic acid was prepared as follows:

A solution of 150 g. (0.88 mol) of cis-cis dimethylmuconic acid obtained by biological oxidation of p-xylene and dissolved in 1 liter of 6 N NaOH is refluxed for 24 hours, diluted with 5 volumes of distilled water, and brought to pH 3 with 12 N HCl. The solid which separates at this point is filtered off and dried; it contains about 80% of the trans-trans acid, with a lesser amount of the cis-trans acid and a minor amount of the cis-cis acid.

The crude product thus obtained is esterified by refluxing it (140 g.) in 1 liter of methanol containing 1 cc. of concentrated $H_2SO_4$ until solution occurs. Cooling the reaction mixture yields the dimethyl ester of the trans-trans acid in substantially pure form (M.P. 102–104° C.).

Two hundred grams of polypropylene powder identical to the polymer disclosed in Example I was blended with 0.1 gram of the dimethyl ester of trans-trans α,α'-dimethylmuconic acid hereinabove described. The polypropylene composition was subsequently compression molded in the identical manner as disclosed for Example I.

EXAMPLE III

Two hundred grams of polypropylene powder identical to the polymer disclosed in Example I were blended with 1.0 gram of the dimethyl ester of trans-trans α,α'-dimethylmuconic acid hereinabove described. The polypropylene composition was subsequently compression molded in the identical manner as disclosed for Example I.

EXAMPLE IV

Two hundred grams of polypropylene powder identical to the polymer disclosed in Example I were blended with 5.0 grams of the dimethyl ester of trans-trans $\alpha,\alpha'$-dimethylmuconic acid hereinabove described. The polypropylene composition was subsequently compression molded in the identical manner as disclosed for Example I.

EXAMPLE V

Two hundred grams of polypropylene powder identical to the polymer disclosed in Example I were blended with 10.0 grams of the dimethyl ester of trans-trans $\alpha,\alpha'$-dimethylmuconic acid hereinabove described. The polypropylene composition was subsequently compression molded in the identical manner as disclosed for Example I.

Each plaque made from the polypropylene compositions disclosed in the examples above was exposed to ultraviolet light for a period of at least 72 hours in accordance with procedures outlined in ASTM D925–55. After each 24-hour period of exposure, each plaque was visually examined for discoloration. The results of these examinations appear in the table below.

TABLE

| Hours of exposure to UV light | Example | | | | |
|---|---|---|---|---|---|
| | I | II | III | IV | V |
| 24 | Slight | None | None | None | None |
| 48 | Medium | do | do | do | Do. |
| 72 | Heavy | Very slight | do | do | Do. |

One direct noticeable result of exposure of crystalline alpha-olefin polymers to ultraviolet light is the appearance of yellow discoloration in the plaque. This yellowing in the polymer is a result of ultraviolet initiated degradation and can therefore be related directly to the ultraviolet stability of the polymer composition. The greater the intensity of yellowness in the polymer, the greater the amount of ultraviolet degradation that has taken place in the polymer.

The data given in the table above illustrate an improved ultraviolet stability of polypropylene containing the dimethyl ester of trans-trans $\alpha,\alpha'$-dimethylmuconic acid. This fact is easily recognized by comparing the results of the effects of UV exposure on the compositions of Examples II–V with the unstabilized polymer of Example I.

The above comparison illustrates the ultraviolet stability achieved with natural colored polypropylene. However, any of the solid crystalline alpha-monoolefin polymers herein disclosed containing any of the many well known additives normally used with these compositions are usable in the present invention.

Ultraviolet stability improving additives other than the dimethyl ester of trans-trans $\alpha,\alpha'$-dimethylmuconic acid set forth in the examples given above can be substituted therefor in any of the alpha-olefin polymers disclosed and provide analogous results. Included among these additives are the cis-cis, cis-trans, and trans-trans isomers of any of the polymethylated muconic acids disclosed above as well as these isomers of the monoesters of each of these acids wherein the ester is a $C_1$–$C_{20}$ hydrocarbyl group and also the diesters of each of these acids wherein each ester is a $C_1$–$C_{20}$ hydrocarbyl group. Any combination of the above additives with any of the disclosed alpha-olefin polymers provide results analogous to those disclosed in the examples given above.

Also, any of the solid substantially crystalline alpha-olefin polymers other than the polypropylene disclosed above can be substituted therefor with substantially analogous results being obtained.

What is claimed is:
1. A solid substantially crystalline alpha-monoolein polymer composition having improved resistance to ultraviolet degradation comprising said polymer containing an ultraviolet stability improving quantity of an additive selected from the group consisting of
   (a) polymethylated muconic acids selected from $\alpha,\alpha'$-dimethylmuconic acid, $\alpha,\beta'$-dimethylmuconic acid, $\alpha,\alpha',\beta$-trimethylmuconic acid, $\alpha,\beta,\beta'$-trimethylmuconic acid and $\alpha,\alpha',\beta,\beta'$-tetramethylmuconic acid,
   (b) hydrocarbyl monoesters of said muconic acids wherein the hydrocarbyl group contains 1–20 carbon atoms,
   (c) hydrocarbyl diesters of said muconic acids wherein the hydrocarbyl groups each contain 1–20 carbon atoms, and
   (d) mixtures thereof.
2. A composition according to claim 1 wherein the polymer is polypropylene.
3. A composition according to claim 1 wherein the polymer is polyethylene.
4. A composition according to claim 1 wherein said ultraviolet stability improvement additive is present in the quantity of 0.05–10.0 weight percent.
5. A composition according to claim 2 wherein said ultraviolet stability improvement additive is present in the quantity of 0.05–10.0 weight percent.
6. A composition according to claim 3 wherein said ultraviolet stability improvement additive is present in the quantity of 0.05–10.0 weight percent.
7. A composition according to claim 2 wherein the ultraviolet stability improvement additive is present in the quantity of 1.0–3.0 weight percent.
8. A composition according to claim 3 wherein the ultraviolet stability improvement additive is present in the quantity of 1.0–3.0 weight percent.
9. A composition according to claim 7 wherein the ultraviolet stability improvement additive is the dimethyl ester of trans-trans $\alpha,\alpha'$-dimethylmuconic acid.
10. A composition according to claim 8 wherein the ultraviolet stability improvement additive is the dimethyl ester of trans-trans $\alpha,\alpha'$-dimethylmuconic acid.
11. A composition according to claim 1 wherein the polymethylated muconic acids are the cis-cis isomers.
12. A composition according to claim 2 wherein the polymethylated muconic acids are the cis-cis isomers.
13. A composition according to claim 3 wherein the polymethylated muconic acids are the cis-cis isomers.
14. A composition according to claim 4 wherein the polymethylated muconic acids are the cis-cis isomers.
15. A composition according to claim 1 wherein the polymethylated muconic acids are the cis-trans isomers.
16. A composition according to claim 2 wherein the polymethylated muconic acids are the cis-trans isomers.
17. A composition according to claim 3 wherein the polymethylated muconic acids are the cis-trans isomers.
18. A composition according to claim 4 wherein the polymethylated muconic acids are the cis-trans isomers.
19. A composition according to claim 1 wherein the polymethylated muconic acids are the trans-trans isomers.
20. A composition according to claim 2 wherein the polymethylated muconic acids are the trans-trans isomers.
21. A composition according to claim 3 wherein the polymethylated muconic acids are the trans-trans isomers.
22. A composition according to claim 4 wherein the polymethylated muconic acids are the trans-trans isomers.

References Cited

UNITED STATES PATENTS 3,409,587   11/1968   Mills _____ 260—45.85

DONALD E. CZAJA, Primary Examiner

V. P. HOKE, Assistant Examiner